Patented Apr. 8, 1952

2,592,421

UNITED STATES PATENT OFFICE 2,592,421

METHOD OF AGGLOMERATING FINELY DIVIDED MATERIALS

Thorbjorn Heilmann, Copenhagen, Denmark, assignor to F. L. Smidth & Co., New York, N. Y., a corporation of New Jersey No Drawing. Application August 5, 1947, Serial No. 766,473. In Denmark October 10, 1945

Section 1, Public Law 690, August 8, 1946.
Patent expires October 10, 1965.

2 Claims. (Cl. 75—3)

This invention relates to a method of agglomerating finely divided materials, as, for example, to produce nodules therefrom. More particularly, the invention is concerned with a novel method for agglomerating finely divided materials, which contain or are capable of taking up water of crystallization, for the purpose of forming the materials into small bodies, which can subsequently be burned at high temperature without impairment.

The agglomeration of finely divided materials is now carried on in various fields, as, for example, it is common to nodulize pulverulent cement raw materials, which are to be burned in a rotary kiln or are either to be burned or preheated on a gas-permeable support. The nodulization of such materials can be accomplished in various ways and one common method involves stirring the materials, while adding restricted amounts of water thereto. The nodules formed in this manner are small spherical bodies having a diameter between 2 and 10 mm. and the nodulization of such materials serves not only to facilitate the transmission of heat thereto but also to reduce the loss of dust materially. To carry out such a nodulizing process satisfactorily, the amount of water added to the materials must be carefully proportioned in relation to the water absorptivity of the material being nodulized and, if too much water is added, the nodules have a sticky surface and are likely to cling together in a pasty mass or slurry while, if too little water is employed, the nodules lack strength. The amount of water to be added may be varied somewhat but ordinarily by only a few per cent.

When nodules are produced by present methods from mixtures of materials containing water of crystallization, the formation of the nodules is not hampered by the presence of water of crystallization but, subsequently, when the nodules are heated, the water of crystallization is given off and the nodules adhere and form a pasty or slurry-like mass. Accordingly, nodulization by known methods of materials which contain large proportions of water of crystallization and give off such water when heated, produces nodules which are not satisfactory for use in various operations. The addition of water during nodulization of materials, which contain no water of crystallization but are capable of taking it up, causes those materials to absorb water of crystallization and give it off during subsequent heating, with the detrimental results indicated. Thus, a molecule of sodium carbonate may absorb up to 10 molecules of water of crystallization and thus increase its weight by about 1½ times. Accordingly, mixtures containing substantial quantities of sodium carbonate cannot be nodulized by ordinary methods to produce nodules satisfactory for subsequent burning at high temperatures, because, when made by such methods, the nodules will contain or retain such an amount of water of crystallization in the salt that the water, when subsequently expelled in the burning, will cause the nodules to adhere to one another.

The present invention is directed to the provision of a method of agglomerating materials containing or capable of taking up water of crystallization, in the practice of which the difficulties above set forth are avoided. In the use of the method of the invention, the agglomerating of finely divided materials containing or capable of taking up water of crystallization is carried on at an elevated temperature, such that the material retains or takes up less water of crystallization than it can at normal or room temperatures. Under such conditions, the agglomerations or nodules produced have satisfactory strength and, when they are subsequently heated, they do not adhere to one another.

In the practice of the invention in the nodulization of a mixture of materials containing alkali salts, such as sodium carbonate, which are capable of taking up water of crystallization, the materials being treated are maintained at a temperature higher than about 35° C. At such temperatures, for example, between 40° C. and 50° C., the sodium salts, high in water of crystallization, are not stable. Thus, sodium carbonate can absorb or retain only one molecule of water of crystallization at a temperature in excess of 35° C. and this water content is not given off until the salt has been heated to about 100° C. At such a temperature, an intense evaporation from nodules of the salt takes place and has no detrimental effect.

The formation of the grains or nodules in accordance with the practice of the invention may be effected by water in accordance with the usual procedures and the materials are maintained at the elevated temperature above set forth during the treatment. Since the nodules are to contain an amount of moisture, which may be expelled during the burning of the nodules, without causing them to cling together and the amount of water used in forming the nodules is fairly critical, it will be apparent that, when the mixture to be nodulized includes an ingredient capable of taking up water of crystallization, this ingredient, when incorporated in the mixture, should be anhydrous or, at least, contain so little water of crystallization that the total water content in individual nodules, including water of crystallization and water for nodulization, will not be so great as to make the nodules pasty, when they are burned. Then, in the nodulization process according to the invention, a temperature is maintained, which prevents the ingredients from taking up additional water of crystallization. In order that the amount of water present in the nodules may be controlled, the ingredients, which do not take up water of crystallization, should be dry, when the nodulization process starts, as is the usual practice.

In the practice of the process of the invention, the water used for nodulization may be preheated or both the water and the material may be preheated, and if the materials are of such nature that comparatively large quantities of water are required for the formation of nodules, it is sufficient to preheat the water only. Under some conditions, and when the nodulization is carried on in a chamber, the heating may be effected by introducing a mixture of water and steam into the chamber, while the nodulization is taking place. This procedure has the advantage that the condensation of the steam causes the material to be heated and the condensed water is employed for the formation of the nodules. If preferred, the maintenance of the materials at the desired temperature during nodulization may be effected by heating the nodulizing apparatus by any suitable known means.

One application of the method of the invention involves agglomerating mixture of raw materials and alkalis, the latter being employed for the purpose of rendering available insoluble matter in the raw material, when the nodules are heated or burned in a rotary kiln or on a gas permeable support. In such a process for making available the insoluble content of the raw materials, those materials are first crushed, if necessary, to a suitable fineness and then mixed with an appropriate alkali, for example, sodium carbonate. This mixture is then heated to a suitable temperature for the length of time necessary for the reaction and air may be admitted during the heating to accelerate the reaction. During the reaction, when sodium carbonate is used, $CO_2$ is liberated and the sodium salt of the insoluble materials is formed. This procedure may be used in various applications, as, for example, in the production of water glass, the treatment of bauxite, the manufacture of synthetic cryolite, and the treatment of various ores and slags containing uranium, vanadium, tungsten or chromium.

The heating or burning of mixtures of raw material containing insoluble matter, together with alkalis, for the purpose of converting the insoluble matter to a soluble form, may be carried on in a reverberatory furnace, a rotary kiln, or on a gas-permeable support, through which hot kiln gases are passed.

When the heating involves the use of such a permeable support, the mixture of finely divided materials must be nodulized, since, otherwise, the gases could not pass therethrough in a satisfactory manner. In processes in which the admission of oxygen is necessary, the passage of hot kiln gases through the nodulized material is advantageous, since such nodules have larger surface areas, at which the reaction can take place, than are available when the kiln gases merely sweep the materials to be treated. The admission of oxygen for carrying on the reaction is necessary in the treatment of chromite and slags containing vanadium produced by blowing iron containing vanadium, and, in such processes, it is of special importance that the mixture of raw materials and sodium carbonate be converted to strong resistant nodules.

I claim:

1. In a method of treating materials consisting of ores and slags containing a metal of the class made up of uranium, vanadium, tungsten, and chromium, the steps of preparing a finely divided mixture of the material and anhydrous sodium carbonate, moistening the mixture and agitating it, while maintaining the mixture at a temperature higher than about 35° C. and below 100° C., and continuing the agitation of the mixture at said temperature, until the mixture has been formed into nodules.

2. A method of treating raw materials, such as mineral ores and slags, which comprises preparing a finely divided mixture of the material and anhydrous sodium carbonate, moistening the mixture and agitating it, while maintaining the mixture at a temperature higher than about 35° C. and below 100° C., continuing the agitation of the mixture at said temperature, until the mixture has been formed into nodules, and burning the nodules as formed at a high temperature.

THORBJORN HEILMANN.

REFERENCES CITED

The following references are of record in the file of this patent:

UNITED STATES PATENTS

| Number | Name | Date |
|---|---|---|
| 1,255,144 | Ekeley | Feb. 5, 1918 |
| 1,396,992 | Carpenter | Nov. 15, 1921 |
| 1,674,806 | Stokes | June 26, 1928 |
| 2,268,816 | Gabeler | Jan. 6, 1942 |
| 2,283,364 | Hansen et al. | May 19, 1942 |
| 2,297,300 | Hardesty et al. | Sept. 29, 1942 |
| 2,394,793 | Maier | Feb. 12, 1946 |
| 2,414,969 | Moose | Jan. 28, 1947 |